US012177333B2

(12) United States Patent
Sato

(10) Patent No.: US 12,177,333 B2
(45) Date of Patent: Dec. 24, 2024

(54) MANAGEMENT SYSTEM, DEVICE, COMPUTER READABLE MEDIUM, AND MANAGEMENT METHOD

(71) Applicant: BROTHER KOGYO KABUSHIKI KAISHA, Nagoya (JP)

(72) Inventor: Yutaro Sato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 148 days.

(21) Appl. No.: 18/060,868

(22) Filed: Dec. 1, 2022

(65) Prior Publication Data

US 2023/0208616 A1 Jun. 29, 2023

(30) Foreign Application Priority Data

Dec. 27, 2021 (JP) ................................ 2021-213025

(51) Int. Cl.
*H04L 9/08* (2006.01)
(52) U.S. Cl.
CPC ................................ *H04L 9/0819* (2013.01)
(58) Field of Classification Search
CPC . H04L 9/0819; H04L 63/0428; H04L 63/062; H04L 63/068; H04L 9/088; G06F 21/608
See application file for complete search history.

(56) References Cited

U.S. PATENT DOCUMENTS

| 10,764,752 | B1 * | 9/2020 | Avetisov | ............ | H04L 63/0823 |
| 2007/0027812 | A1 * | 2/2007 | Ogawa | ................ | H04L 63/0428 |
| | | | | | 705/57 |
| 2007/0150731 | A1 * | 6/2007 | Ohkoshi | ................... | H04L 9/32 |
| | | | | | 713/168 |
| 2015/0311934 | A1 * | 10/2015 | Jang | ..................... | H04W 12/06 |
| | | | | | 455/558 |

FOREIGN PATENT DOCUMENTS

JP 2019-148957 A 9/2019

OTHER PUBLICATIONS

Pauthal et al., "SEEN: A Selective Encryption Method to Ensure Confidentiality for Big Sensing Data Streams", IEEE Transactions on Big Data, vol. 5, No. 3, Jul.-Sep. 2019.*

* cited by examiner

*Primary Examiner* — Morshed Mehedi
(74) *Attorney, Agent, or Firm* — Scully, Scott, Murphy & Presser, PC

(57) ABSTRACT

A management system includes a management device, a device being incapable of directly communicating with the management device, a storage device configured to communicate with the management device and the device, and a server configured to communicate with the management device and the device. The management device is configured to, in a case where the management device receives data identification information for identifying execution data from the server, upload the data identification information to the storage device, the execution data being used in a device execution process executed by the device. The device is configured to execute a transmission process of transmitting the data identification information and an encryption key having an expiration date to the server, a decryption process of decrypting the received execution data with the encryption key, and a data usage process by using the decrypted execution data.

7 Claims, 11 Drawing Sheets

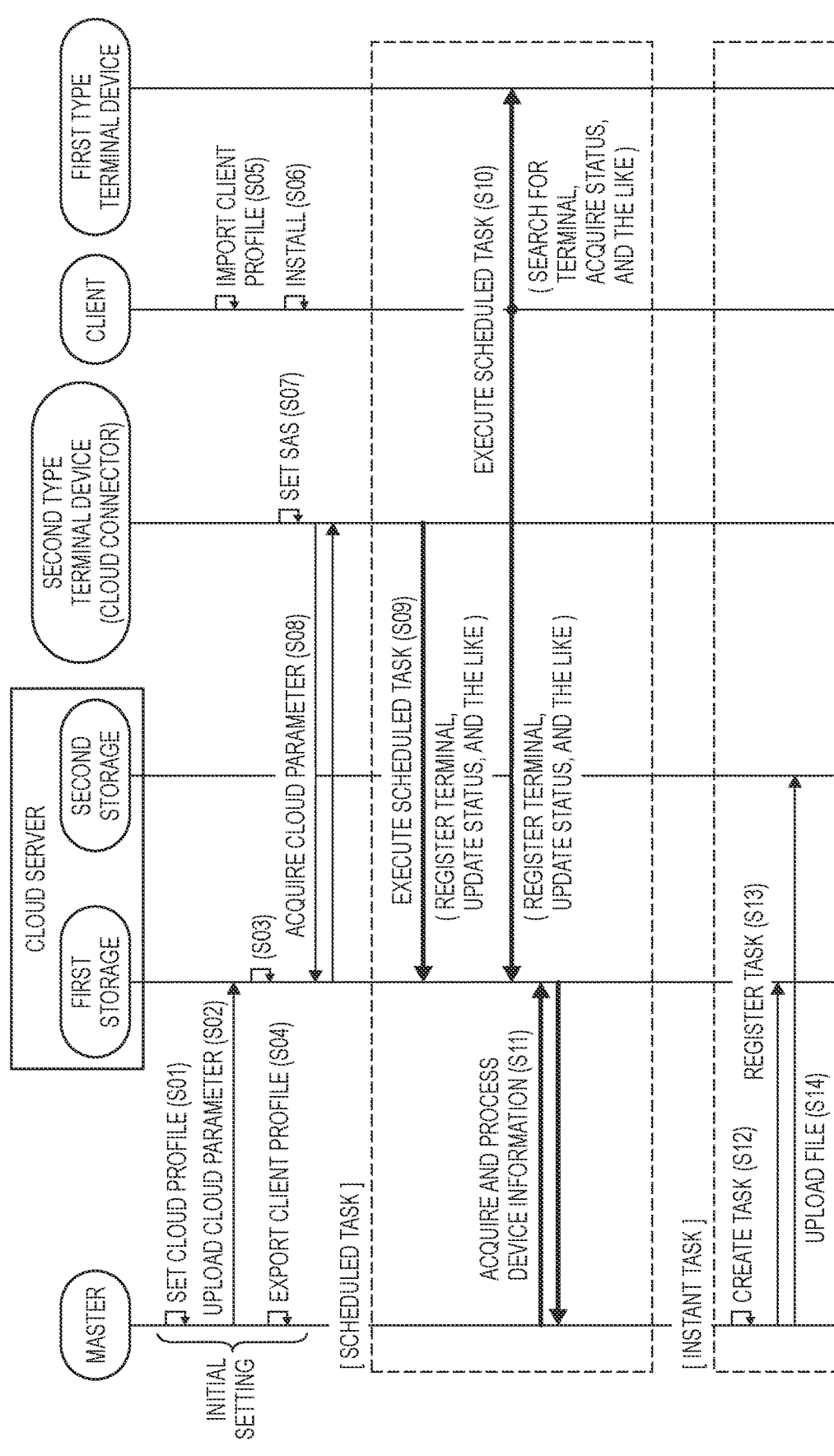

MANAGEMENT SYSTEM, DEVICE, COMPUTER READABLE MEDIUM, AND MANAGEMENT METHOD

REFERENCE TO RELATED APPLICATIONS

This application claims priority from Japanese Patent Application No. 2021-213025 filed on Dec. 27, 2021. The entire content of the priority application is incorporated herein by reference.

BACKGROUND ART

In a related art, a management server that performs data communication with both a management device and an image forming device acquires setting data for setting the image forming device from the management device, and provides the acquired setting data to the image forming device in response to an inquiry from the image forming device.

In a management system in which the management device manages the image forming device via the management server as described above, in a case where the setting data from a setting server different from the management server is to be provided to the image forming device, an encryption key having an expiration date may have to be provided from the image forming device to the setting server. The setting server provides, to the image forming device, the setting data encrypted with the encryption key having the expiration date. The image forming device acquires the setting data by decrypting the provided setting data with the encryption key having the expiration date.

In a case where exchange of the encryption key having the expiration date and the setting data between the setting server and the image forming device is performed via the management device and the management server, the expiration date of the encryption key having the expiration date may expire, and valid setting data may not be able to be provided to the image forming device.

DESCRIPTION

According to an aspect of the present disclosure, a management system includes a management device, a device that is incapable of directly communicating with the management device, a storage device, and a server. The storage device is configured to communicate with the management device and the device. The server is configured to communicate with the management device and the device.

The management device is configured to, in a case where the management device receives data identification information for identifying execution data from the server, upload the data identification information to the storage device, and the execution data is used in a device execution process executed by the device.

The device is configured to execute a transmission process, a decryption process, and a data usage process. The transmission process is to, in a case where the data identification information is downloaded from the storage device, transmit the data identification information and an encryption key having an expiration date to the server.

The decryption process is to, in a case where the execution data encrypted with the encryption key is received from the server, decrypt the received execution data with the encryption key. The data usage process is to execute the device execution process by using the execution data decrypted in the decryption process.

By the management system according to the present disclosure configured as described above, the encryption key having the expiration date and the execution data encrypted with the encryption key may be directly transmitted and received between the server and the device rather than via the storage device. Therefore, the management system according to the present disclosure may avoid the expiration date of the encryption key having the expiration date from expiring. As a result, the management system according to the present disclosure may avoid occurrence of a situation in which the execution data cannot be decrypted since the expiration date of the encryption key expires.

Another aspect of the present disclosure relates to a device of a management system in which a management device and the device are each configured to communicate with a storage device and a server, and a controller of the device is configured to execute a transmission process, a decryption process, and a data usage process.

The device according to the present disclosure is a device included in the management system according to the present disclosure, and may achieve the same effects as those of the management system according to the present disclosure.

Still another aspect of the present disclosure relates to a program configured to cause a controller to execute a transmission process, a decryption process, and a data usage process, and the controller is included in a device of a management system in which a management device and the device are each configured to communicate with a storage device and a server.

The program according to the present disclosure is a program executed by the management system according to the present disclosure, and may achieve the same effects as those of the management system according to the present disclosure. Still another aspect of the present disclosure relates to a management method that is executed by a device of a management system in which a management device and the device are each configured to communicate with a storage device and a server, and the management method includes a transmission step, a decryption step, and a data usage step.

The management method according to the present disclosure is a method executed by the management system according to the present disclosure, and the same effects as those of the management system according to the present disclosure may be achieved by executing the method.

FIGS. 4A and 4B show an explanatory diagram of an example of a management sequence executed by the management system.

Figure 1:
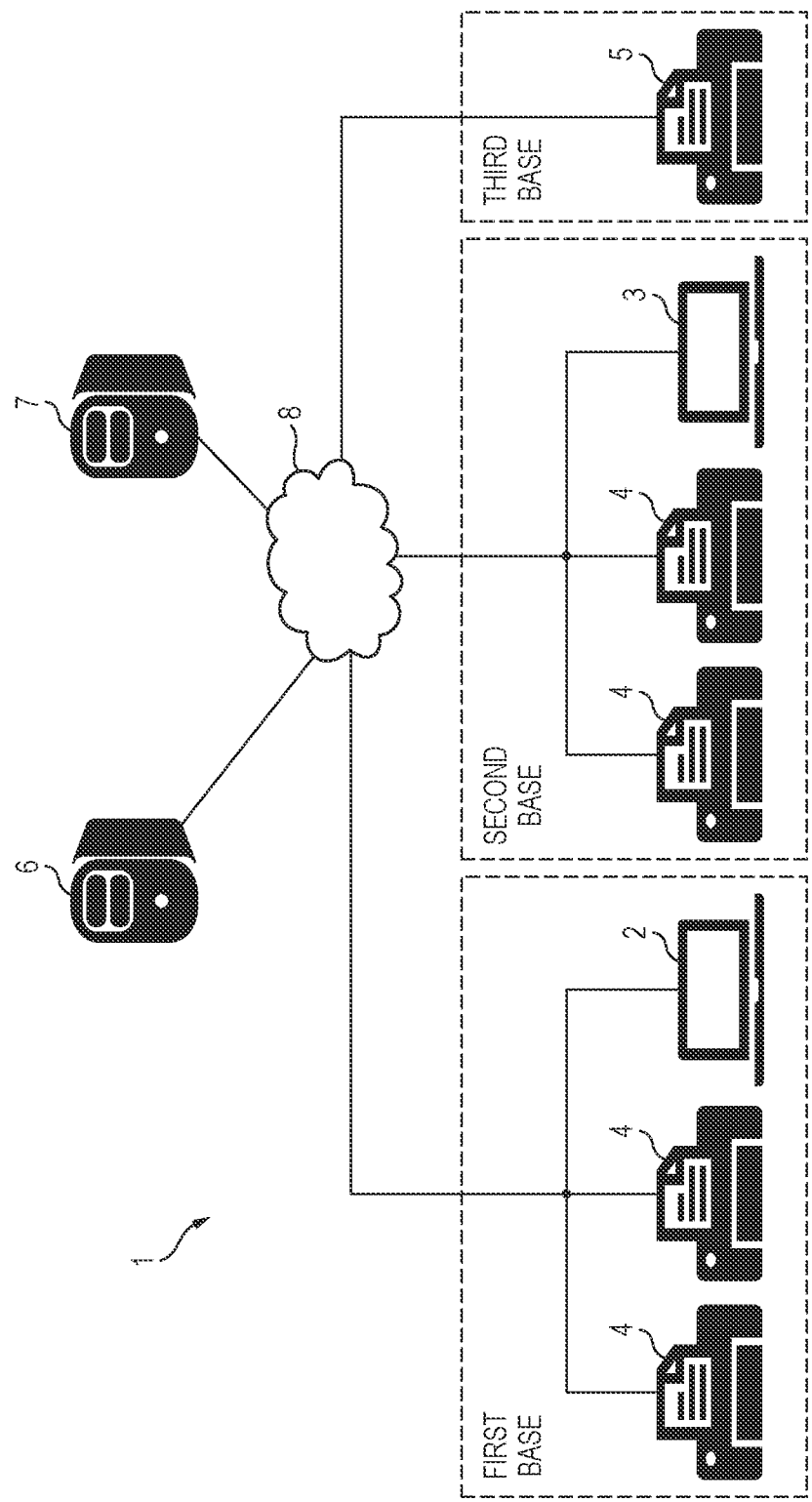
FIG. 1 is a block diagram showing a configuration of a management system.

Hereinafter, an embodiment of the present disclosure will be described with reference to the drawings.

(1) Overall Configuration

A management system 1 according to the present embodiment is a network system configured to manage terminal devices 4 and 5 via a cloud server 6 by cooperation of a master 2 and a client 3, and the terminal devices 4 and 5 are disposed in a plurality of bases.

As shown in FIG. 1, the management system 1 includes the master 2, the client 3, the terminal devices 4 and 5, the cloud server 6, and a license server 7.

The master 2 may communicate, via a local area network, with the terminal devices 4 installed in a first base. Further, the master 2 may communicate with the cloud server 6 and the license server 7 via a wide area network 8.

The client 3 may communicate, via a local area network, with the terminal devices 4 installed in a second base. Further, the client 3 may communicate with the cloud server 6 and the license server 7 via the wide area network 8. The terminal device 5 installed in a third base may communicate with the cloud server 6 and the license server 7 via the wide area network 8.

The local area network may include, for example, at least one of a wireless LAN and a wired LAN. The wide area network 8 may include, for example, the Internet. A local area network may be constructed in the third base. In this case, the terminal device 5 may be connected to the wide area network 8 via the local area network in the third base.

Each of the terminal devices 4 cannot use a cloud service provided by the cloud server 6. In other words, each of the terminal devices 4 does not have a function of communicating with the cloud server 6. Hereinafter, the terminal devices 4 are particularly referred to as first type terminal devices 4. On the other hand, the terminal device 5 is a terminal device that may use the cloud service provided by the cloud server 6. In other words, the terminal device 5 has a function of communicating with the cloud server 6. Hereinafter, the terminal device 5 is particularly referred to as a second type terminal device 5.

The first type terminal devices 4 installed in the second base are managed by the master 2 via the client 3 and the cloud server 6. The second type terminal device 5 installed in the third base is managed by the master 2 via the cloud server 6 rather than via the client 3.

The terminal devices 4 and 5 managed by the master 2 may be, for example, a group of terminal devices managed by an organization such as a company. In this case, the bases may be activity bases of the organization. For example, the first base where the master 2 is present may be an office having an organization management department. The other second and third bases may be branch offices of the organization separated from the first base.

Examples of the terminal devices 4 and 5 include a printer, a scanner, a digital multifunction device in which functions of the printer and the scanner are integrated, and the like. The master 2 and the client 3 are each implemented, for example, by installing a dedicated computer program in a personal computer.

(2) Device Configuration

Figure 2:
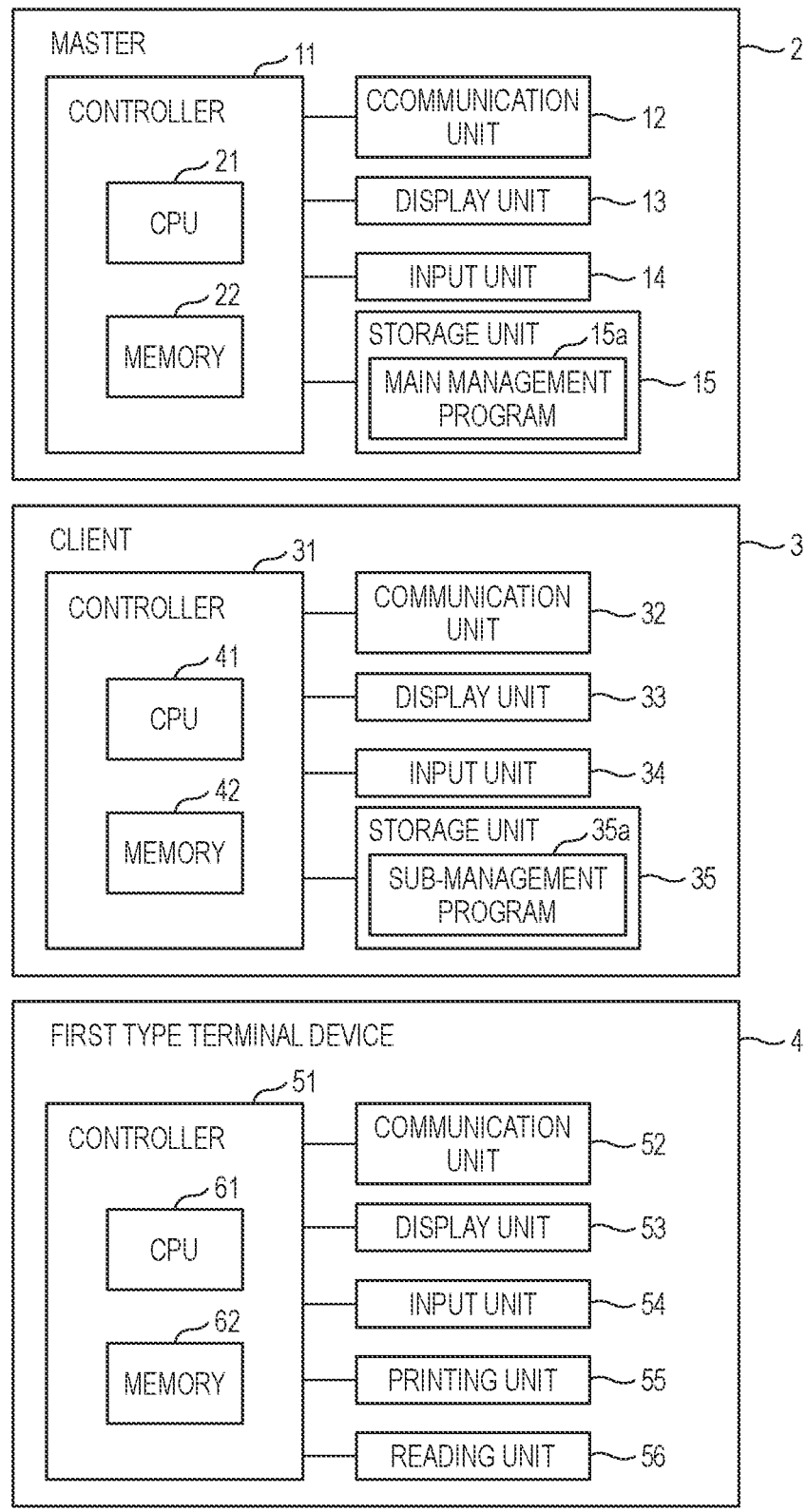
FIG. 2 is a block diagram showing configurations of a master, a client, and a first type terminal device.

As shown in FIG. 2, the master 2 includes a controller 11, a communication unit 12, a display unit 13, an input unit 14, and a storage unit 15. The controller 11 includes a CPU 21 and a memory 22. The CPU 21 serving as a processor executes a process in accordance with a computer program stored in the storage unit 15. The memory 22 is used as a work memory in a case where the above process is executed.

The storage unit 15 includes, for example, a storage such as a solid state drive and a hard disk drive, and stores various computer programs and data. The storage unit 15 stores a main management program 15a. The main management program 15a is a computer program for causing the CPU 21 to implement a management function to be implemented by the master 2. It may be understood that a process executed by the controller 11, which is to be described below, is implemented by the process executed by the CPU 21 in accordance with the computer program.

The communication unit 12 is connected to the local area network in the base where the master 2 is present, and is further connected to the wide area network 8. The communication unit 12 may be connected to the wide area network 8 via a router (not shown). The display unit 13 displays various screens for a user who operates the master 2. Examples of the display unit 13 include a liquid crystal display. Examples of the various screens include a screen for displaying log information and status information of each of the terminal devices 4 and 5 to be managed, and a screen for remotely operating the terminal devices 4 and 5 in accordance with operation signals from the user.

The input unit 14 includes one or more input devices via which an operation signal from the user who operates the master 2 is input, such as a keyboard and a pointing device. The controller 11 operates in accordance with the operation signal input via the input unit 14.

The client 3 includes a controller 31, a communication unit 32, a display unit 33, an input unit 34, and a storage unit 35. The controller 31 includes a CPU 41 and a memory 42. The CPU 41 serving as a processor executes a process in accordance with a computer program stored in the storage unit 35.

The storage unit 35 stores a sub-management program 35a. The sub-management program 35a is a computer program for causing the CPU 41 to implement a function related to the management function of the master 2, which is to be implemented by the client 3. It may be understood that a process executed by the controller 31, which is to be described below, is implemented by the process executed by the CPU 41 in accordance with the computer program.

The communication unit 32 is connected to the local area network in the base where the client 3 is present, and is further connected to the wide area network 8. The communication unit 32 may be connected to the wide area network 8 via a router (not shown). The display unit 33 includes, for example, a liquid crystal display, and displays various screens for a user who operates the client 3. The input unit 34 includes one or more input devices via which an operation signal from the user who operates the client 3 is input. The controller 31 operates in accordance with the operation signal input via the input unit 34.

The first type terminal device 4 includes a controller 51, a communication unit 52, a display unit 53, and an input unit 54. In a case where the first type terminal device 4 is the digital multifunction device, the first type terminal device 4 may further include a printing unit 55 and a reading unit 56. The first type terminal device 4 may include only one of the printing unit 55 and the reading unit 56.

The controller 51 includes a CPU 61 and a memory 62. The memory 62 may include a nonvolatile memory such as a flash memory in addition to a RAM, and the nonvolatile memory may store a computer program, setting data, and the like.

The CPU 61 serving as a processor executes overall control of the entire first type terminal device by executing a process in accordance with a computer program stored in the memory 62. It may be understood that a process executed by the controller 51, which is to be described below, is implemented by the process executed by the CPU 61 in accordance with the computer program.

The communication unit 52 is connected to the local area network in the base where the first type terminal device 4 is present, so that the communication unit 52 may communicate with the master 2 or the client 3 present in the base. The display unit 53 includes, for example, a liquid crystal display, and displays various screens for a user who operates the first type terminal device 4. The input unit 54 includes one or more input devices such as a touch panel on the liquid crystal display in order to input an operation signal from the user.

The printing unit 55 prints an image on a sheet under control of the controller 51. Examples of the printing unit 55 include an inkjet printer and a laser printer. According to the present embodiment, the status information such as a remaining amount of a color material and the log information such as the number of printed sheets are provided from the first type terminal device 4 to the master 2 via the client 3 and the cloud server 6 by a method to be described later. The reading unit 56 reads a reading target such as a printed matter under control of the controller 51.

Figure 3:
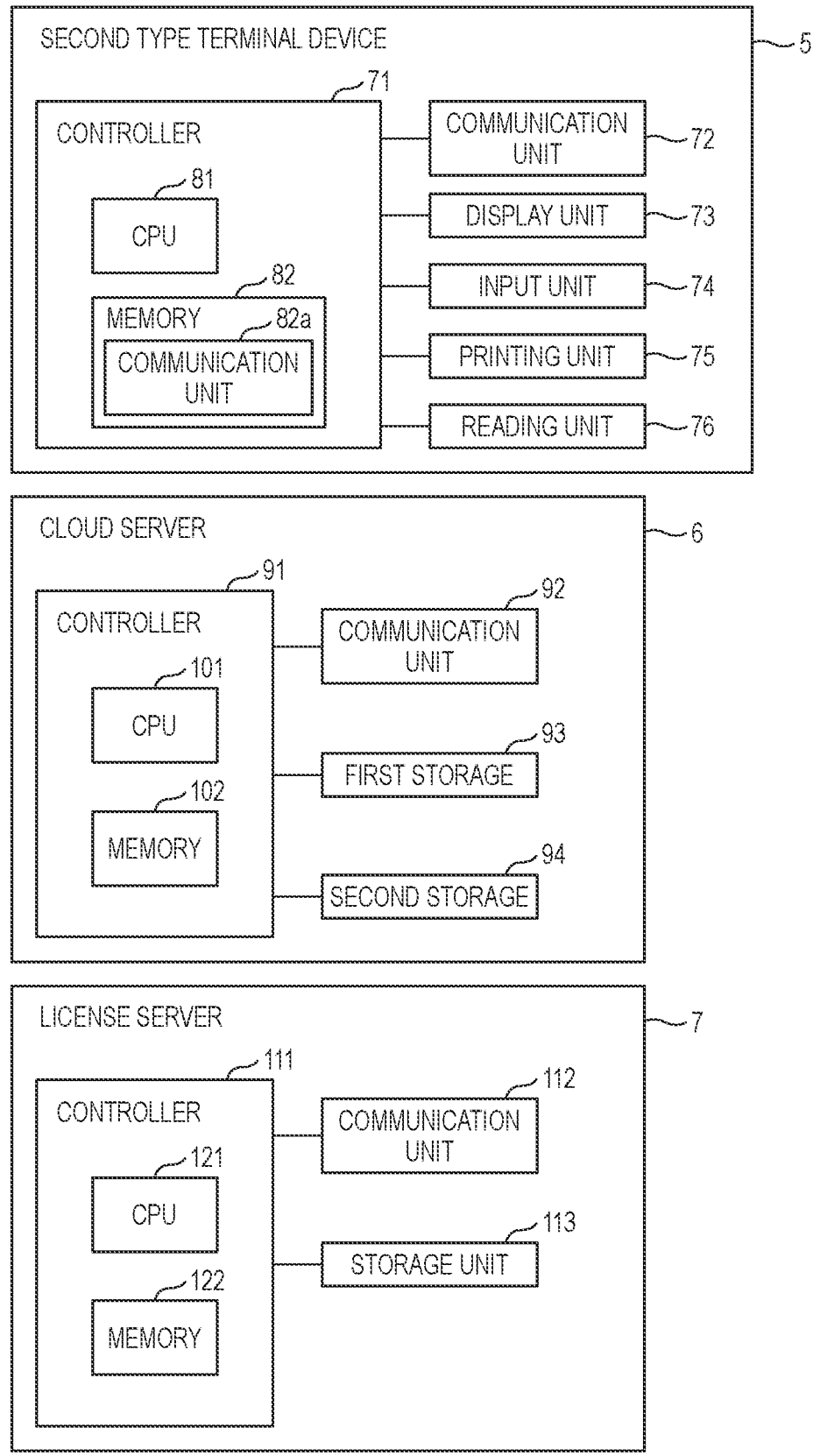
FIG. 3 is a block diagram showing configurations of a second type terminal device, a cloud server, and a license server.

As shown in FIG. 3, the second type terminal device 5 includes a controller 71, a communication unit 72, a display unit 73, and an input unit 74. In a case where the second type terminal device 5 is the digital multifunction device, the second type terminal device 5 may further include a printing unit 75 and a reading unit 76. The second type terminal device 5 may include only one of the printing unit 75 and the reading unit 76.

The controller 71 includes a CPU 81 and a memory 82. The memory 82 may include a nonvolatile memory such as a flash memory, and the nonvolatile memory may store a computer program, setting data, and the like.

The CPU 81 serving as a processor executes overall control of the entire device by executing a process in accordance with a computer program stored in the memory 82. The memory 82 stores a communication program 82a. The communication program 82a is a program for using the cloud service provided by the cloud server 6. It may be understood that a process executed by the controller 71, which is to be described below, is implemented by the process executed by the CPU 81 in accordance with the computer program.

The communication unit 72 is connected to the wide area network 8, so that the communication unit 72 may communicate with the cloud server 6 and the license server 7. In a case where the local area network is constructed in the third base, the communication unit 72 may be connected to the wide area network 8 via the local area network. The display unit 73 includes, for example, a liquid crystal display. The input unit 74 includes one or more input devices via which an operation signal from a user is input.

The printing unit 75 prints an image on a sheet under control of the controller 71. According to the present embodiment, the status information such as a remaining amount of a color material and the log information such as the number of printed sheets are provided from the second type terminal device 5 to the master 2 via the cloud server 6 by a method to be described later. The reading unit 76 reads a reading target such as a printed matter under control of the controller 71.

The cloud server 6 includes a controller 91, a communication unit 92, a first storage 93, and a second storage 94. The controller 91 includes a CPU 101 and a memory 102.

The CPU 101 serving as a processor executes a process in accordance with a computer program stored in the memory 102. The process executed by the CPU 101 includes a process of causing the cloud server 6 to function as a cloud storage. It may be understood that a process executed by the controller 91, which is to be described below, is implemented by the process executed by the CPU 101 in accordance with the computer program.

The communication unit 92 is connected to the wide area network 8, so that the communication unit 92 may communicate with the master 2, the client 3, and the second type terminal device 5.

The above cloud storage includes a table storage and an object storage. The controller 91 executes the above process, so that the first storage 93 functions as the table storage, and the second storage 94 functions as the object storage.

The exemplary first storage 93 functions as a NoSQL data store, and may store a table having a group of schema-less entities as constituent elements. Each of the entities in the table includes a set of properties.

The exemplary second storage 94 functions as the object storage into which any text file and binary file may be read and written as objects from an outside by using an HTTP/HTTPS protocol.

Azure is known as a cloud service that provides the table storage and the object storage described above. The cloud server 6 may operate in the same manner as such a cloud service. Azure is a registered trademark of Microsoft Corporation.

The license server 7 includes a controller 111, a communication unit 112, and a storage unit 113. The controller 111 includes a CPU 121 and a memory 122.

The CPU 121 serving as a processor executes overall control of the license server 7 by executing a process in accordance with a computer program stored in the memory 122. It may be understood that a process executed by the controller 111, which is to be described below, is implemented by the process executed by the CPU 121 in accordance with the computer program.

The communication unit 112 is connected to the wide area network 8, so that the communication unit 112 may communicate with the master 2, the client 3, and the second type terminal device 5. The storage unit 113 includes, for example, a storage such as a solid state drive and a hard disk drive, and stores various computer programs and data.

(3) Sequence Outline

Next, an operation sequence related to management will be outlined.

In a case where the main management program 15a is installed in the master 2, the controller 11 of the master 2 executes a process in accordance with the main management program 15a. That is, the master 2 has the management function.

As shown in FIG. 4A, the master 2 first executes a process of setting a cloud profile in S01. For example, the master 2 sets the cloud profile in accordance with a setting operation executed by a main administrator via the input unit 14.

Setting of the cloud profile includes setting a cloud parameter. The cloud parameter includes an initial setting parameter. As will be described later, the client 3 and the second type terminal device 5 each execute a polling operation for the cloud server 6 and an update operation of information stored in the cloud server 6. The polling operation is an operation of periodically confirming the presence or absence of an instant task to be described later. The update operation of the information is an operation defined by a scheduled task to be described later.

The initial setting parameter includes, for example, a cycle of the polling operation (hereinafter, referred to as a polling cycle) and a cycle of the update operation of the information (hereinafter, referred to as an information update cycle). A plurality of types of information update cycles are set according to types of the information to be updated.

The cloud parameter may further include a scheduled task template. The scheduled task template defines process contents of the scheduled task to be executed by each of the terminal devices 4 and 5. The above information update cycle corresponds to an execution cycle of one or more processes in the scheduled task.

The scheduled task template and a scheduled task table are present individually. That is, in the first storage 93, the scheduled task template is written into a first storage area, and the scheduled task table is written into a second storage area different from the first storage area.

The setting of the cloud profile further includes setting a shared access signature (hereinafter, referred to as SAS) for using the cloud service. SAS is an abbreviation for shared access signature.

The SAS is individually set for each of the first storage 93 and the second storage 94 (that is, the table storage and the object storage). In the setting of the cloud profile in the master 2, the main administrator sets, as a part of the cloud profile, the SAS which is set in each of the first storage 93 and the second storage 94, so that the master 2 may access the first storage 93 and the second storage 94.

The same SAS is also set in a case where the main management program 15a is installed in the master 2. In a case where the master 2 accesses the cloud server 6, the SAS set in the master 2 is transmitted to the cloud server 6. In a case where the transmitted SAS matches the SAS of an access destination set in the cloud server 6, communication (that is, reading and writing of data) with the access destination is possible.

As shown in S02, the master 2 uploads the cloud parameter according to the set cloud profile to the first storage 93 of the cloud server 6 in accordance with an operation of the main administrator. As a result, as shown in S03, the uploaded cloud parameter is written into the first storage 93.

As shown in S04, the master 2 exports at least a part of the cloud profile from the master 2 as a client profile (that is, data to be read by the client 3). For example, the client profile may include at least one of the initial setting parameter, the scheduled task template, and the SAS described above. The client profile exported by the master 2 is provided to the client 3. The client profile may be provided to the client 3 by any method. For example, the client profile may be transmitted from the master 2 to the client 3 by an e-mail or other methods.

As shown in S06, a sub-administrator operates the client 3 and installs the sub-management program 35a in the client 3. At this time, as shown in S05, the client profile provided from the master 2 is imported into the client 3 by an operation of the sub-administrator. That is, various types of data set in the client profile are appropriately set in the client 3. For example, the SAS, the polling cycle, the information update cycle, and the like set in the client profile are imported and set in the client 3. The above scheduled task template may be imported.

In a case where the sub-management program 35a is installed and the client profile is set as described above, the client 3 may use the cloud server 6. As a result, information may be transmitted between the client 3 and the master 2 via the cloud server 6. The client 3 may execute a management relay function via the cloud server 6. The management relay function includes a task execution instruction from the master 2 to the first type terminal device 4, and transmission of the log information and the status information from the first type terminal device 4 to the master 2, and is a function of relaying information between the master 2 and the first type terminal device 4.

As shown in S07, a SAS is registered in the second type terminal device 5 by an input operation executed by an administrator of the second type terminal device 5 (hereinafter, referred to as a device administrator).

Registration of the SAS in the second type terminal device 5 may be executed, for example, via the input unit 74 of the second type terminal device 5. For example, the SAS may be registered in the second type terminal device 5 from an information processing device different from the second type terminal device 5. Specifically, a predetermined web server may be built in the second type terminal device 5. The SAS may be registered in the second type terminal device 5 by accessing the web server from the information processing device different from the second type terminal device 5, inputting the SAS via a user interface in the information processing device, and transmitting the SAS to the web server.

The controller 71 of the second type terminal device 5 in which the SAS is registered executes a process in accordance with the communication program 82a. The controller 71 that executes the process in accordance with the communication program 82a is hereinafter referred to as a cloud connector. As shown in S08, the cloud connector accesses the first storage 93 of the cloud server 6 by using the SAS, and refers to the cloud parameter written by the master 2. The cloud connector acquires the cloud parameter and sets the cloud parameter in the second type terminal device 5.

In a case where the cloud connector accesses the cloud server 6, the SAS of an access source is transmitted from the cloud connector to the cloud server 6. In a case where the transmitted SAS matches the SAS of an access destination set in the cloud server 6, communication (that is, reading and writing of data) with the access destination is possible.

In a case where initial setting including setting of the cloud parameter and the SAS described above (that is, processes of S07 and S08) is completed, as shown in S09, the second type terminal device 5 (that is, the cloud connector) periodically executes the scheduled task according to the set information update cycle.

In a case where initial setting including setting of the cloud parameter and the SAS described above (that is, processes of S05 and S06) is completed, as shown in S10, the client 3 periodically executes, according to the set information update cycle, the scheduled task of updating the information stored in the first storage 93 of the cloud server 6.

In a case where corresponding device information is not registered in the first storage 93, the scheduled task to be executed by the cloud connector first starts from registering the device information in the first storage 93. The device information corresponding to the cloud connector is predetermined information indicating the second type terminal device 5 mounted with the cloud connector.

In a case where there is the first type terminal device 4 whose corresponding device information is not registered in the first storage 93 among the first type terminal devices 4 to be managed, the scheduled task to be executed by the client 3 starts from registering in the first storage 93 the device information of the first type terminal device 4 whose device information is not registered. The device information of the first type terminal device 4 is predetermined information indicating the first type terminal device 4.

The first storage 93 includes the scheduled task table as one table. The scheduled task table includes a group of one or more entities. One entity includes a plurality of properties. In the present embodiment, the plurality of properties include "Partition Key", "Row Key", "Device Id", "Notify Parameter", "Progress", and "Source", as shown, for example, in FIG. 5.

The scheduled task table includes three entities related to "log", "status", and "registration" for each of the terminal devices 4 and 5. That is, in the present embodiment, there is an individual scheduled task table (hereinafter, referred to as an individual table) for each of the terminal devices 4 and 5 to be managed, and the scheduled task table may be regarded as a collection of these individual tables. Each individual table includes three entities related to "log", "status", and "registration" of a corresponding one of the terminal devices 4 and 5.

In a case where the corresponding terminal device is the first type terminal device 4, information in the entity is updated by the client 3 that manages the first type terminal device 4. In a case where the corresponding terminal device is the second type terminal device 5, information in the entity is updated by the cloud connector of the second type terminal device 5.

In a case of the entity related to the "log", "log", which is a character string indicating the "log", is stored in the property "Partition Key". The entity related to the "log" stores, in the property "Notify Parameter", log information of a terminal device corresponding to a device ID stored in the property "Device Id". The device ID is identification information unique to each of the terminal devices 4 and 5.

In a case where the corresponding terminal device is the printer or the digital multifunction device, the log information may include information indicating the total number of printed sheets to be printed by the corresponding terminal device. The log information may include, as a print history, information that indicates a user who issues a print command and the number of printed sheets for each print job.

In a case of the entity related to the "status", "status", which is a character string indicating the "status", is stored in the property "Partition Key". The entity related to the "status" stores, in the property "Notify Parameter", status information of the terminal device corresponding to the device ID stored in the property "Device Id". In a case where the corresponding terminal device is the printer or the digital multifunction device, the status information may include information about a remaining amount of a color material and error information such as a sheet jam of the corresponding terminal device.

In a case of the entity related to the "registration", "registration", which is a character string indicating the "registration", is stored in the property "Partition Key". The entity related to the "registration" stores, in the property "Notify Parameter", device information of the terminal device corresponding to the device ID stored in the property "Device Id". The device information includes a plurality of items that describes a basic configuration of a device.

A device ID of a device whose entity is updated is stored in the property "Device Id".

A character string, which is described in a JSON format in order to indicate instruction contents of the scheduled task, is stored in the property "Notify Parameter".

Figure 5:
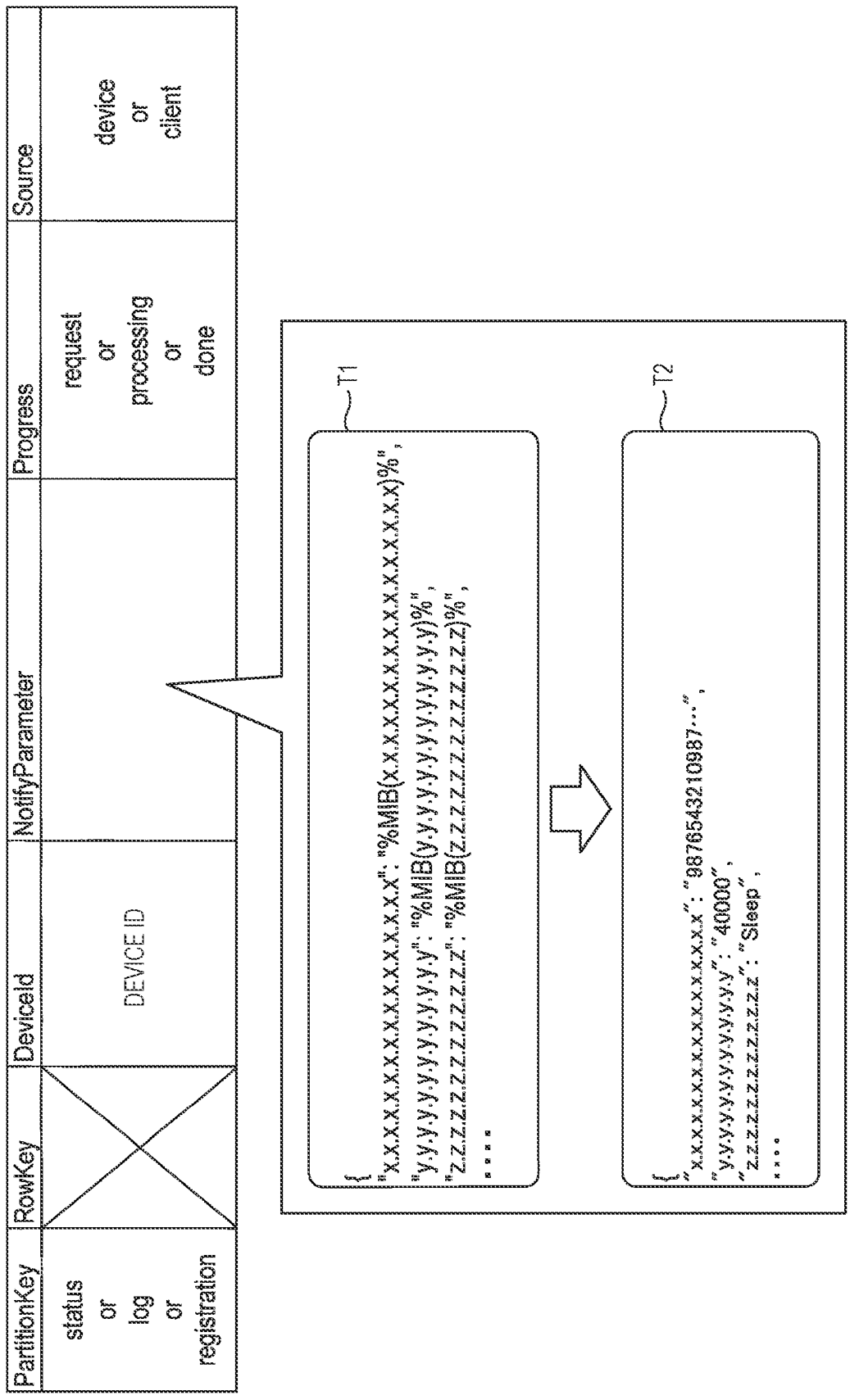
FIG. 5 is an explanatory diagram showing an example of a scheduled task table.

For example, in the property "Notify Parameter" in the entity related to the "status", a character string is described in a JSON format so as to associate an object identifier (hereinafter, referred to as an OID) used in a management information base (hereinafter, referred to as a MIB) of a corresponding parameter with a value of the object identifier. A description of "x.x.x.x.x . . . " and "y.y.y.y.y . . . " shown in a task instruction T1 in FIG. 5 is an abstract representation showing examples of the object identifier. MIB is an abbreviation for management information base.

An instruction on a second row in the task instruction T1 is "'x.x.x.x . . . '": "'% MIB (x.x.x.x . . . ) %'". The above "x.x.x.x . . . " is an object ID in the MIB.

An instruction on a third row in the task instruction T1 is "'y.y.y.y . . . '": "'% MIB (y.y.y.y . . . ) %'". The above "y.y.y.y . . . " is an object ID in the MIB.

In a case where the above "x.x.x.x . . . " is expressed as Oid1, the instruction on the second row is "Oid1": "% MIB (Oid1) %". "% MIB (Oid1) %" is an instruction to acquire a value corresponding to Oid1 which is the object ID and to overwrite "% MIB (Oid1) %" with the acquired value. Therefore, in a case where the value corresponding to Oid1 is "XXXXXXX", "'Oid1'": "'% MIB (Oid1) %'" is rewritten to "'Oid1'": "'XXXXXXX'" in registered data.

Similarly, in a case where "y.y.y.y . . . " which is the object ID is expressed as Oid2, the instruction on the third row is "'Oid2'": "'% MIB (Oid2) %'".

A description of "x.x.x.x.x . . . " and "y.y.y.y.y . . . " shown in a task result T2 in FIG. 5 is an abstract representation showing an example of an update result.

In each of the entities related to the "log" and the "registration", a character string in the property "Notify Parameter" is also rewritten in the same manner as that in the entity related to the "status".

The property "Progress" is stored with a character string indicating a progress status, such as a character string "done" indicating that a task is completed, a character string "request" indicating that execution of an instruction is requested, or a character string "processing" indicating that the task is being executed.

The property "Source" indicates a type of the device whose entity is updated. In a case where the entity is updated by the client 3, "client", which is a character string indicating the client 3, is stored in the property "Source" in the entity. In a case where the entity is updated by the cloud connector, "device", which is a character string indicating the second type terminal device 5, is stored in the property "Source" in the entity.

The entity of the cloud connector of the second type terminal device 5 is updated by the cloud connector. The entity of each of the first type terminal devices 4 is updated by the client 3 which is connected, together with the first type terminal devices 4, to the same local area network. That is, the client 3 updates the entity of each of the first type terminal devices 4 subordinate to the client 3 (that is, the first type terminal devices 4 that are management relay targets). Identification information of the client 3 whose management relay targets are the first type terminal devices 4 may be written as a part of the device information into the registration entity of each of the first type terminal devices 4.

The client 3 communicates with each of the first type terminal devices 4 that are the management relay targets in the same local area network, and acquires, from each of the first type terminal devices 4, information necessary for updating the device information. The client 3 may update the registration entity of the corresponding first type terminal device 4 based on the acquired information.

Further, the client 3 periodically communicates, via the local area network, with each of the first type terminal devices 4 that are the management relay targets, and acquires corresponding log information and status information. The client 3 may update the log entity and the status entity of the corresponding first type terminal device 4 based on the acquired log information and the acquired status information.

The cloud connector of the second type terminal device 5 may periodically access the cloud server 6, and may update the log entity and the status entity of the second type terminal device 5 based on the log information and the status information of the second type terminal device 5.

The master 2 also functions as the client 3. That is, it may be understood that the master 2 functions as the client 3 for the first type terminal devices 4 in the first base. Specifically, in the scheduled task table in the first storage 93 of the cloud server 6, the three entities related to the "log", the "status", and the "registration" are generated corresponding to each of the first type terminal devices 4 (hereinafter, referred to as "master subordinate terminal devices") in the first base. Similarly to the client 3, the master 2 may acquire various types of information from each of the master subordinate terminal devices, and update the registration entity, the log entity, and the status entity of each corresponding master subordinate terminal device.

Further, as shown in S11 in FIG. 4A, the master 2 periodically accesses the first storage 93 of the cloud server 6 and refers to the log entity, the status entity, and the registration entity of each of the terminal devices 4 and 5. Based on these references, the master 2 may execute a process of storing the log information, the status information, and the device information of each of the terminal devices 4 and 5 in the storage unit 15.

Further, the master 2 may display a list of the registered terminal devices 4 and 5 or display the log information and the status information of each of the terminal devices 4 and 5 on a screen of the display unit 13 in accordance with an operation signal which is output from the input unit 14 by an operation of the user. As described above, the management system 1 may remotely monitor, in the base where the master 2 is installed, states of the terminal devices 4 and 5 used in the plurality of bases.

As shown in S12, the master 2 receives an execution request operation for the instant task from the main administrator in accordance with an operation signal which is output from the input unit 14 by an operation of the main administrator, and generates, in accordance with the execution request operation, data indicating an entity of the instant task (hereinafter, referred to as an instant task entity). The instant task is a non-periodic task other than the scheduled task.

Further, as shown in S13, the master 2 may register the corresponding instant task entity in the first storage 93 by transmitting the created data to the cloud server 6.

Figure 6:
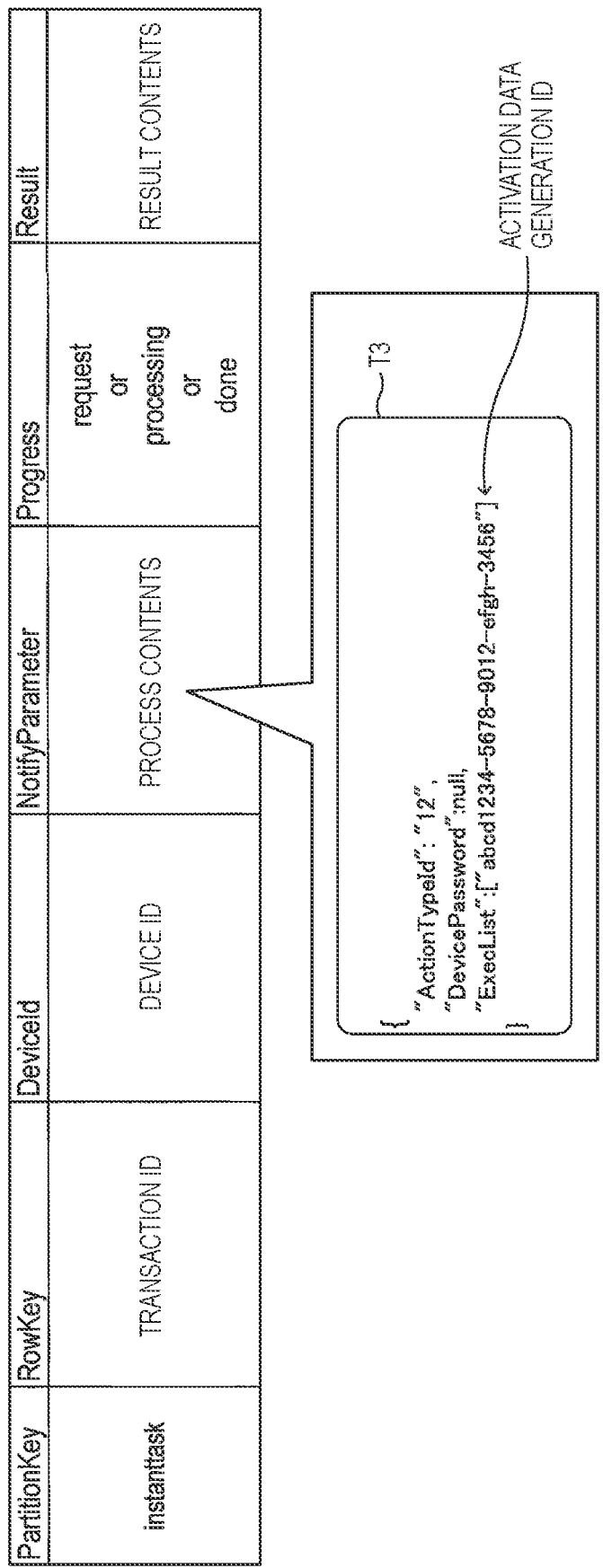
FIG. 6 is an explanatory diagram showing an example of an instant task table.

The instant task entity is registered in the first storage 93 in a form of, for example, an instant task table shown in FIG. 6.

The instant task table includes properties of "Partition Key", "Row Key", "Device Id", "Notify Parameter", "Progress", and "Result".

Here, "instant task", which is a character string indicating an instant task, is stored in the property "Partition Key".

A respective transaction ID for identifying each instant task is stored in the property "Row Key".

The device ID for identifying the first type terminal device 4 or the second type terminal device 5 that is an instruction destination is stored in the property "Device Id".

A character string, which is described in a JSON format in order to indicate instruction contents of the instant task, is stored in the property "Notify Parameter".

A character string indicating an instruction progress status is stored in the property "Progress".

A character string indicating an execution result of the instant task is stored in the property "Result".

In a case where a predetermined file is necessary for executing the instant task, the master 2 stores the file in the second storage 94 as shown in S14 in FIG. 4A. In this case, information (for example, a URL) indicating a storage destination of the file is described in the property "Notify Parameter". For example, in a case where the instant task is to update firmware in the terminal devices 4 and 5, the master 2 stores, in the second storage 94, an update file necessary for updating the firmware. In this case, for example, a storage destination URL of the update file for the firmware may be described in the property "Notify Parameter".

Figure 4B:
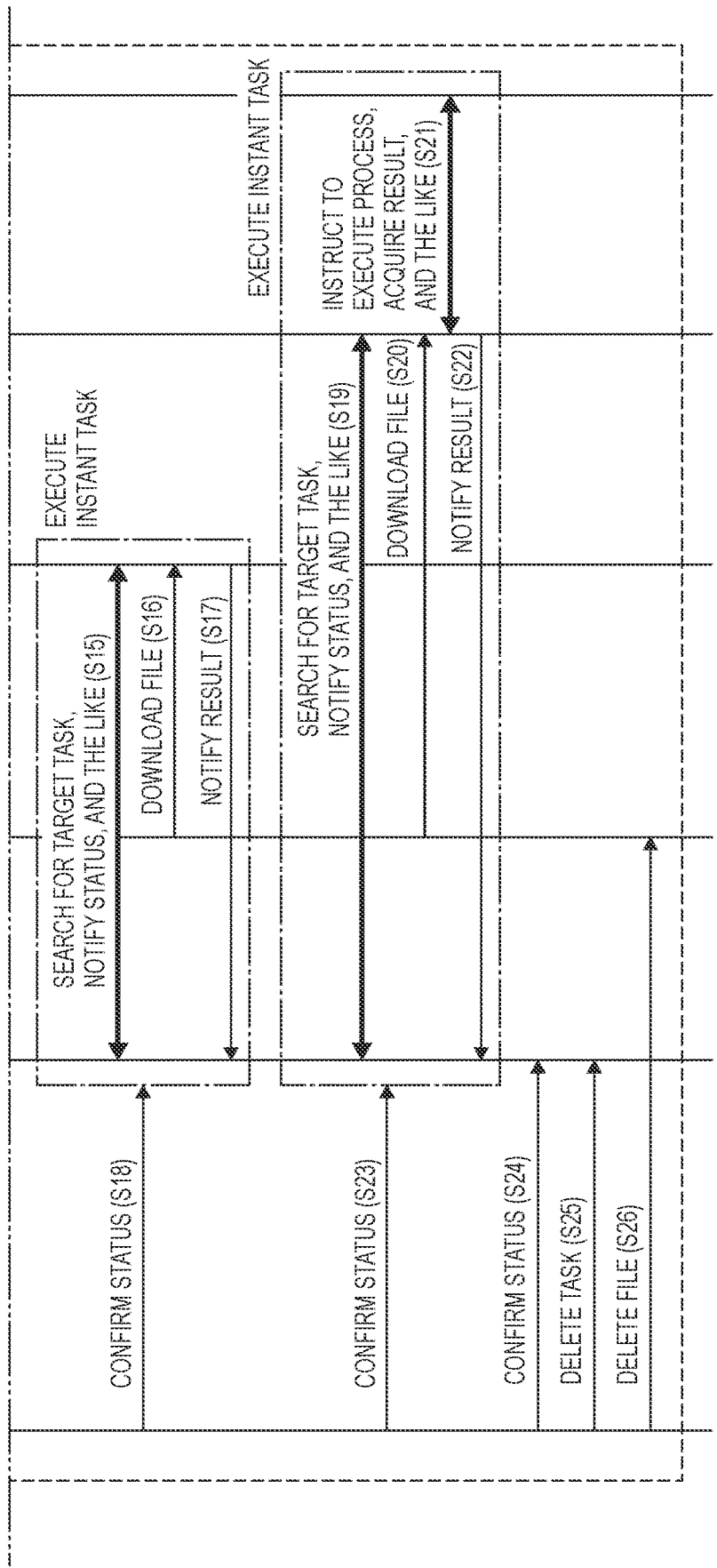

As shown in S15 in FIG. 4B, the cloud connector of the second type terminal device 5 accesses the first storage 93 of the cloud server 6 and searches for the instant task for the cloud connector, at the set polling cycle. That is, the cloud connector determines whether a new entity of the instant task to be executed by the cloud connector is registered in the instant task table.

In a case where the new entity is registered, the cloud connector rewrites a character string in the property "Progress" in the corresponding instant task entity from "request" to "processing", thereby transmitting, to the master 2, information indicating that a request for the instant task is received.

After registering the instant task entity, the master 2 confirms a status of the instant task corresponding to the instant task entity as shown in S18 in FIG. 4B. Specifically, the master 2 periodically refers to, at the set polling cycle, the instant task entity in the instant task table registered in the first storage 93. The master 2 may perform periodic reference, thereby confirming, based on the fact that a value of the property of the progress status is updated, that the request for the instant task is received.

The cloud connector of the second type terminal device 5 refers to the property "Notify Parameter" in the instant task entity in a case where the instant task is executed. In a case where a data file necessary for executing the instant task is present in the second storage 94, as shown in S16, the cloud connector downloads the data file from the second storage 94 based on storage destination information (for example, a URL) described in the property "Notify Parameter".

In a case where the instant task is ended, the cloud connector of the second type terminal device 5 updates the corresponding instant task entity as shown in S17. Specifically, the cloud connector rewrites the character string in the property "Progress" in the corresponding instant task entity from "processing" to "done", thereby transmitting, to the master 2, information indicating that execution of the instant task is completed.

As shown in S19 in FIG. 4B, the client 3 accesses the first storage 93 of the cloud server 6 and searches for an instant task for the management relay target, at the set polling cycle. That is, the client 3 determines whether a new entity of the instant task to be executed by each of the first type terminal devices 4 that are the management relay targets of the client 3 is registered in the instant task table. Hereinafter, among the first type terminal devices 4 that are the management relay targets, each of one or more first type terminal devices 4 set as an execution target of the instant task in the instant task table (that is, one or more first type terminal devices 4 corresponding to the device ID stored in the property "Device Id") is referred to as an instant task execution target.

In a case where the new instant task entity is registered for the instant task execution target, the client 3 rewrites a character string in the property "Progress" in the corresponding instant task entity from "request" to "processing", thereby transmitting, to the master 2, information indicating that a request for the instant task is received. Further, the client 3 refers to the property "Notify Parameter" in the instant task entity, and recognizes process contents to be executed. Then, as shown in S20, the client 3 acquires a data file necessary for executing the instant task from the second storage 94 as necessary based on the recognized process contents.

Thereafter, as shown in S21, the client 3 instructs the instant task execution target to execute the instant task via the local area network. At this time, the data file acquired from the second storage 94 is transferred to each instant task execution target. Then, the client 3 acquires the execution result of the instant task from the instant task execution target.

In a case where execution of the instant task is completed in all the instant task execution targets, the client 3 updates the instant task entity of the corresponding instant task execution target as shown in S22. Specifically, the client 3 rewrites the character string in the property "Progress" in the corresponding instant task entity from "processing" to "done", thereby transmitting, to the master 2, information indicating that the execution of the instant task is completed.

As confirmation of the status, as shown in S23 in FIG. 4B, the master 2 refers to the instant task entity in the instant task table in the first storage 93 to know that the character string in the property "Progress" is rewritten to "done", thereby confirming that the instant task is completed, and writing a process result into the storage unit 15.

Further, the master 2 may display the process result on the screen of the display unit 13. In a case where the master 2 confirms that the registered instant task is completed in all the corresponding instant task execution targets as shown in S24, the master 2 deletes the instant task entity of the instant task that is no longer necessary from the first storage 93 as shown in S25. As shown in S26, the master 2 deletes, from the second storage 94, the data file provided for the instant task (for example, the update file for the firmware).

As described above, the management system 1 may remotely control, in the base where the master 2 is installed, the terminal devices 4 and 5 used in the plurality of bases, by registering and updating the instant task entity in the first storage 93 of the cloud server 6 and transferring the data file via the second storage 94.

(4) Process Related to Function Extension

Next, an operation sequence related to function extension for the second type terminal device 5 will be outlined.

Figure 7:
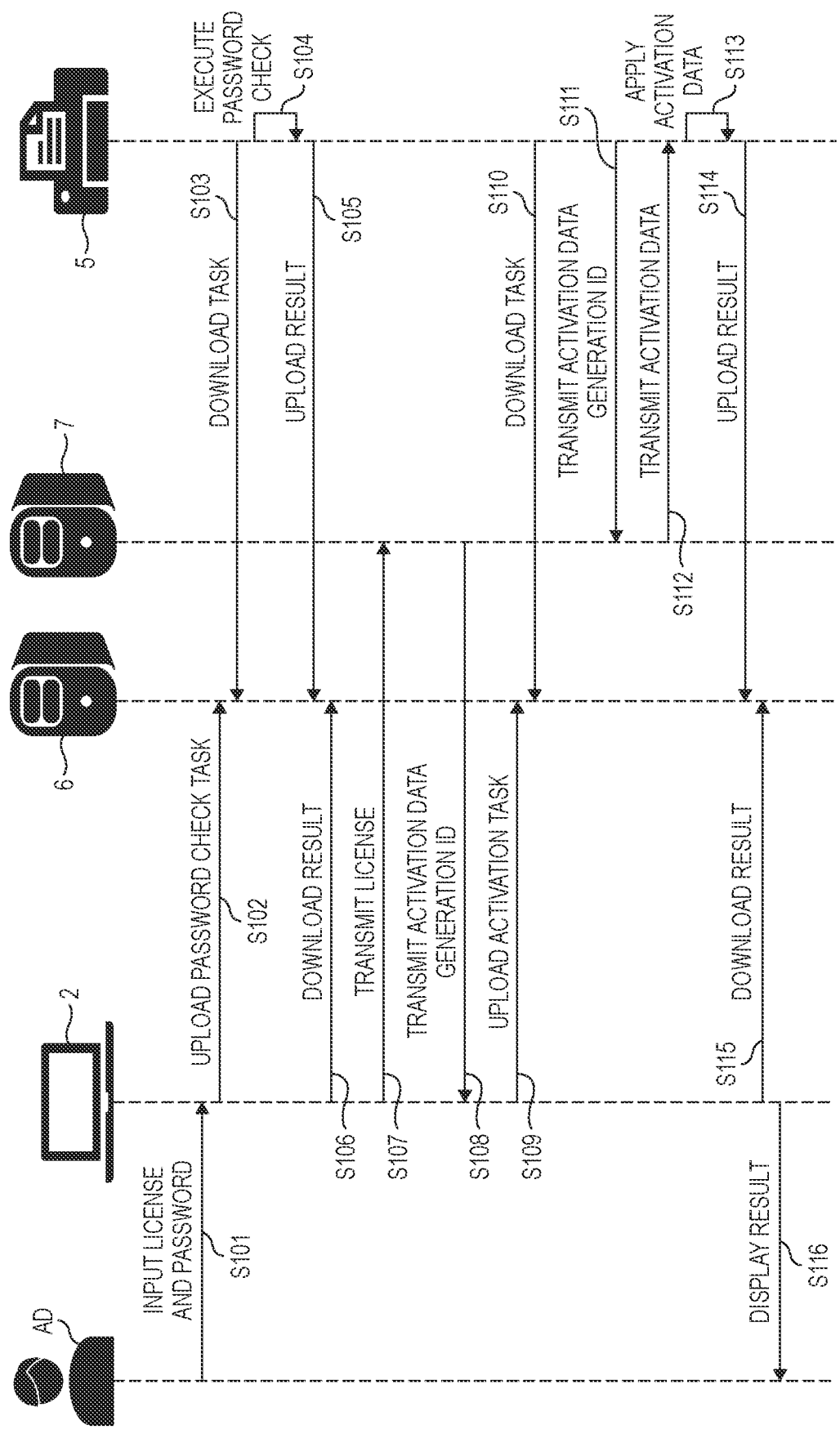
FIG. 7 is a sequence diagram showing operations related to function extension of the second type terminal device.

As shown in FIG. 7, in S101, a main administrator AD operates the input unit 14 of the master 2 to input, to the master 2, a license for specifying the function extension for the second type terminal device 5 and a management password set in advance in the second type terminal device 5 that is a function extension target. The license is, for example, information formed by separating a twenty-digit number by a hyphen every four digits. For example, the function extension in FIG. 7 is to add, to the second type terminal device 5, a function of allowing the master 2 to remotely operate the second type terminal device 5.

Then, in S102, the master 2 uploads, to the cloud server 6, an instant task entity of a task for instructing the second type terminal device 5 that is the function extension target to execute password check (hereinafter, referred to as a password check task). The device ID indicating the second type terminal device 5 that is the function extension target is stored in the property "Device Id" of the instant task entity of the password check task, and a character string for instructing to check the management password input to the master 2 is stored in the property "Notify Parameter".

The second type terminal device 5 searches for the instant task for the second type terminal device 5 at the set polling cycle, and downloads the instant task entity of the password check task from the cloud server 6 in S103.

Then, the second type terminal device 5 executes the password check in S104.

Specifically, the second type terminal device 5 confirms whether a management password included in the downloaded instant task entity matches the management password set in the second type terminal device 5.

Further, in S105, the second type terminal device 5 uploads a result of the password check to the cloud server 6. Specifically, the second type terminal device 5 stores a character string indicating whether the check is successful, in the property "Result" in the instant task entity of the password check task for the second type terminal device 5.

Thereafter, in S106, the master 2 downloads the result of the password check from the cloud server 6. Specifically, the master 2 acquires the character string which is stored in the property "Result" in the instant task entity of the password check task registered in the cloud server 6.

In a case where the password check is successful, in S107, the master 2 transmits, to the license server 7, the license input to the master 2.

In a case where the license server 7 receives the license, in S108, the license server 7 transmits, to the master 2, an activation data generation ID corresponding to the received license.

In a case where the master 2 receives the activation data generation ID, in S109, the master 2 uploads, to the cloud server 6, an instant task entity of a task for instructing to activate the function extension (hereinafter, referred to as an activation task).

In the property "Device Id" of the instant task entity of the activation task, the device ID indicating the second type terminal device 5 that is the function extension target is stored.

For example, as shown in a task instruction T3 in FIG. 6, a character string {"Action TypeId": "12", "DevicePassword": null, "ExecList": ["abcd1234-5678-9012-efgh-3456"]} is stored in the property "Notify Parameter" of the instant task entity of the activation task.

'"ActionTypeId": "12"' in the task instruction T3 indicates execution of a process in which an action ID is set to "12".

'"DevicePassword": null' in the task instruction T3 indicates that a device password is unnecessary. "ExecList": ["abcd1234-5678-9012-efgh-3456"]' indicates that the activation data generation ID is "abcd1234-5678-9012-efgh-3456".

The second type terminal device 5 searches for the instant task for the second type terminal device 5 at the set polling cycle, and downloads the instant task entity of the activation task from the cloud server 6 in S110.

In a case where the second type terminal device 5 downloads the instant task entity of the activation task, the second type terminal device 5 extracts the activation data generation ID from the instant task entity of the activation task. Then, in S111, the second type terminal device 5 transmits the extracted activation data generation ID and an encryption key having an expiration date to the license server 7.

In a case where the license server 7 receives the activation data generation ID and the encryption key, the license server 7 encrypts, with the received encryption key, activation data corresponding to the received activation data generation ID. Then, in S112, the license server 7 transmits the encrypted activation data to the second type terminal device 5.

In a case where the second type terminal device 5 receives the encrypted activation data, the second type terminal device 5 decrypts the activation data with the encryption key. Then, the second type terminal device 5 activates the function extension corresponding to the license by applying the decrypted activation data to the second type terminal device 5 in S113. Then, the second type terminal device 5 uploads an execution result of the activation task to the cloud server 6. Specifically, the second type terminal device 5 stores a character string indicating whether activation of the function extension is successful, in the property "Result" in the instant task entity of the activation task for the second type terminal device 5.

Thereafter, in S115, the master 2 downloads the result of activation from the cloud server 6. Specifically, the master 2 acquires the character string which is stored in the property "Result" in the instant task entity of the activation task registered in the cloud server 6.

Then, in S116, the master 2 displays the result of activation on the display unit 13. As a result, the main administrator AD may confirm whether the function extension is activated in the second type terminal device 5.

Next, a procedure of a first activation process executed by the controller 71 of the second type terminal device 5 will be described. The first activation process is a process that is repeatedly executed during an operation of the second type terminal device 5.

Figure 8:
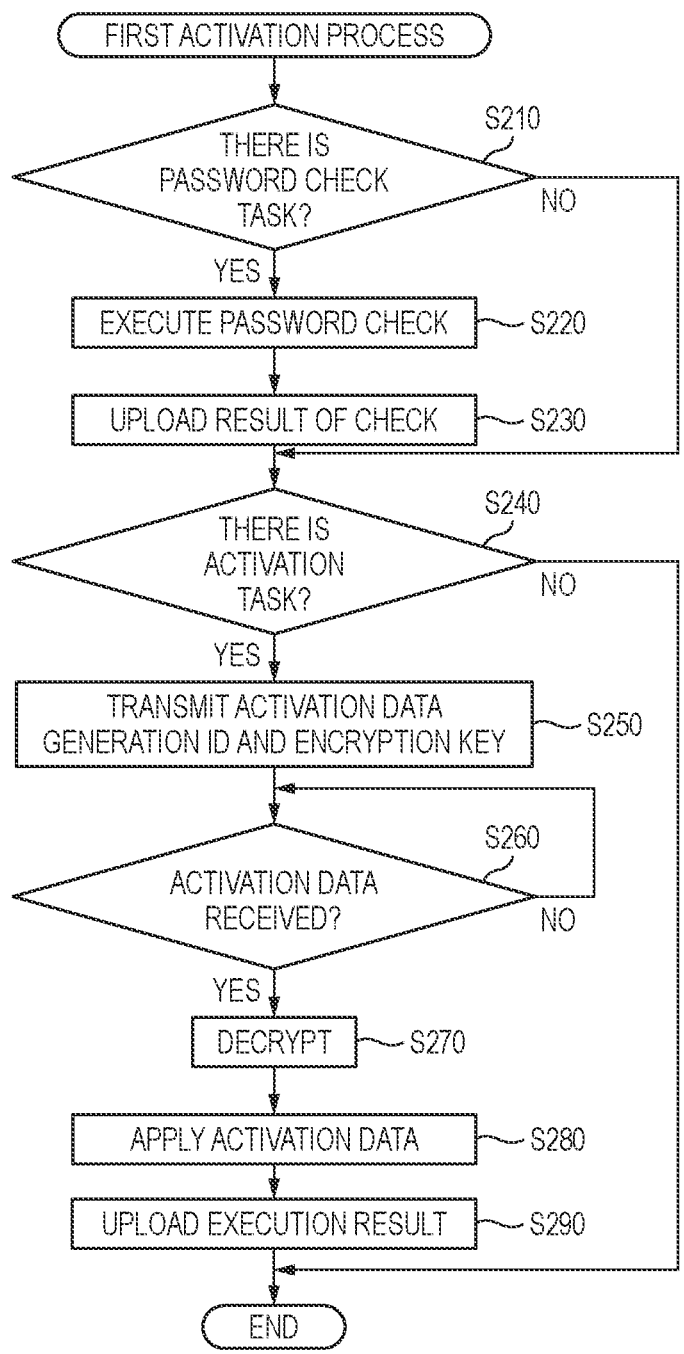
FIG. 8 is a flowchart showing a first activation process.

In a case where the first activation process is executed, as shown in FIG. 8, the CPU 81 of the controller 71 first determines in S210 whether the instant task entity of the password check task for the CPU 81 is downloaded from the cloud server 6. Here, if the instant task entity of the password check task is not downloaded, the CPU 81 proceeds to S240.

On the other hand, if the instant task entity of the password check task is downloaded, the CPU 81 executes the password check in S220. Then, the CPU 81 uploads the result of the password check to the cloud server 6 in S230, and then proceeds to S240.

Upon proceeding to S240, the CPU 81 determines whether the instant task entity of the activation task is downloaded from the cloud server 6. Here, if the instant task entity of the activation task is not downloaded, the CPU 81 ends the first activation process.

On the other hand, if the instant task entity of the activation task is downloaded, in S250, the CPU 81 extracts the activation data generation ID from the instant task entity of the activation task and transmits the extracted activation data generation ID and the encryption key having the expiration date to the license server 7.

Then, in S260, the CPU 81 determines whether the encrypted activation data is received from the license server 7. Here, if the encrypted activation data is not received, the CPU 81 repeats a process of S260 to stand by until the encrypted activation data is received.

In a case where the encrypted activation data is received, the CPU 81 decrypts the activation data with the encryption key in S270. Further, the CPU 81 activates the function extension corresponding to the license by applying the decrypted activation data to the second type terminal device 5 in S280.

Then, the CPU 81 uploads the execution result of the activation task to the cloud server 6 in S290, and then ends the first activation process.

Next, an operation sequence related to function extension for the first type terminal device 4 will be outlined.

Figure 9:
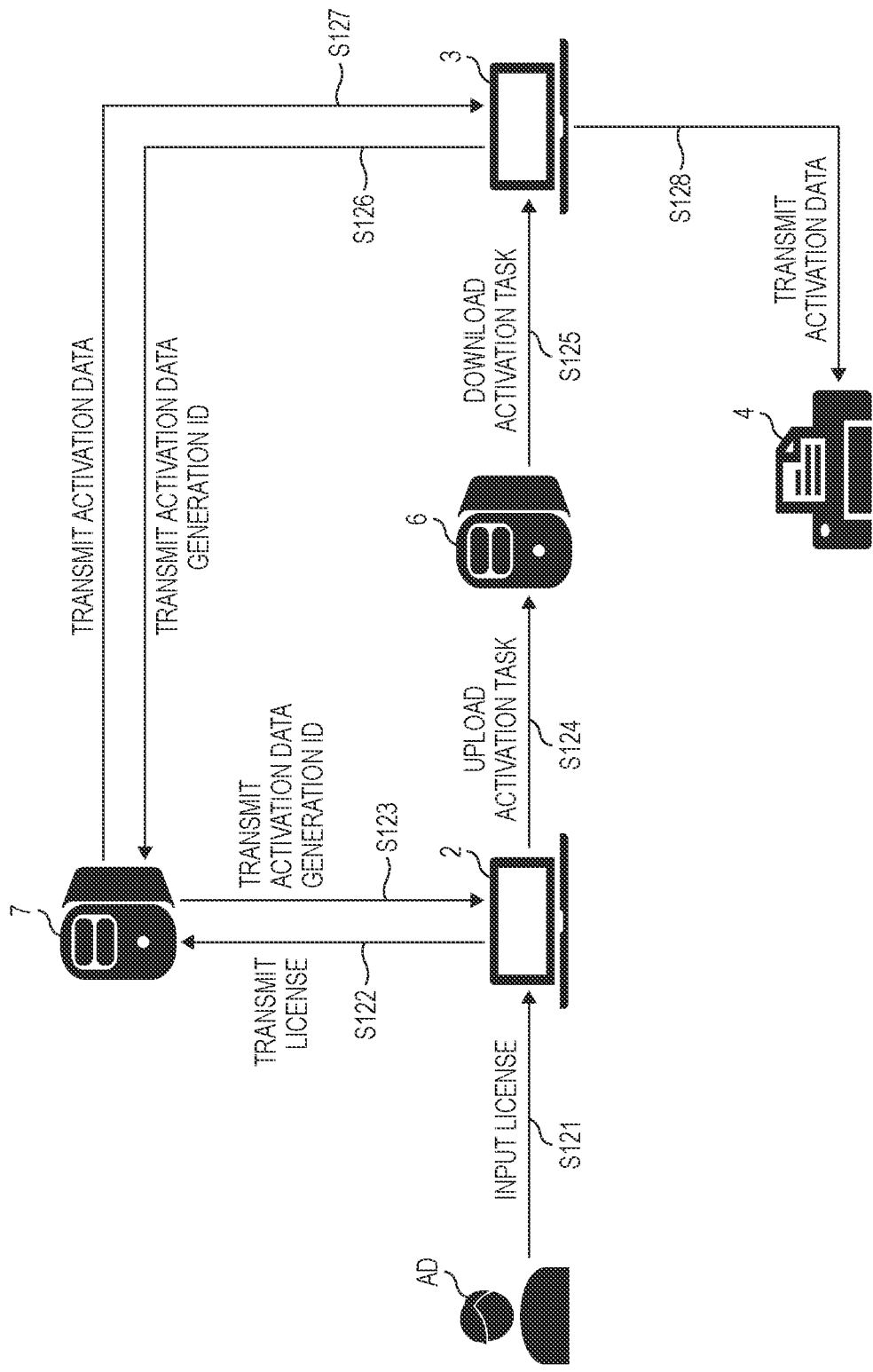
FIG. 9 is a sequence diagram showing operations related to function extension of the first type terminal device.

As shown in FIG. 9, in S121, the main administrator AD operates the input unit 14 of the master 2 to input, to the master 2, a license for specifying the function extension for the first type terminal device 4 and a management password set in advance in the first type terminal device 4 that is a function extension target. For example, the function extension in FIG. 9 is to add, to the first type terminal device 4, a function of allowing the master 2 to remotely operate the first type terminal device 4.

Then, the master 2 uploads, to the cloud server 6, an instant task entity of a password check task for instructing to execute password check on the first type terminal device 4 that is the function extension target. The device ID indicating the first type terminal device 4 that is the function extension target is stored in the property "Device Id" of the instant task entity of the password check task, and a character string for instructing to check the management password input to the master 2 is stored in the property "Notify Parameter".

The client 3 searches for the instant task for the first type terminal device 4 connected to the client 3 (hereinafter, referred to as a "connected terminal device") at the set polling cycle, and downloads the instant task entity of the password check task from the cloud server 6.

Then, the client 3 executes password check. Specifically, the client 3 confirms whether a management password included in the downloaded instant task entity matches the management password set in the connected terminal device.

Further, the client 3 uploads a result of the password check to the cloud server 6. Specifically, the client 3 stores a character string indicating whether the check is successful, in the property "Result" in the instant task entity of the password check task for the connected terminal device.

Thereafter, the master 2 downloads the result of the password check from the cloud server 6. In FIG. 9, an operation for the password check described above is not shown.

In a case where the password check is successful, in S122, the master 2 transmits, to the license server 7, the license input to the master 2.

In a case where the license server 7 receives the license, in S123, the license server 7 transmits, to the master 2, an activation data generation ID corresponding to the received license.

In a case where the master 2 receives the activation data generation ID, in S124, the master 2 uploads, to the cloud server 6, an instant task entity of an activation task. In the property "Device Id" of the instant task entity of the activation task, the device ID indicating the first type terminal device 4 that is the function extension target is stored.

The client 3 searches for the instant task for the connected terminal device at the set polling cycle, and downloads the instant task entity of the activation task from the cloud server 6 in S125.

In a case where the client 3 downloads the instant task entity of the activation task, the client 3 extracts the activation data generation ID from the instant task entity of the activation task. Then, in S126, the client 3 transmits the extracted activation data generation ID and an encryption key having an expiration date to the license server 7.

In a case where the license server 7 receives the activation data generation ID and the encryption key, the license server 7 encrypts, with the received encryption key, activation data corresponding to the received activation data generation ID. Then, in S127, the license server 7 transmits the encrypted activation data to the client 3.

In a case where the client 3 receives the encrypted activation data, the client 3 decrypts the activation data with the encryption key. Then, in S128, the client 3 transmits the decrypted activation data to the first type terminal device 4 that is the function extension target.

The first type terminal device 4 that receives the activation data activates the function extension corresponding to the license by applying the activation data to the first type terminal device 4.

Next, a procedure of a second activation process executed by the controller 31 of the client 3 will be described. The second activation process is a process that is repeatedly executed during an operation of the client 3.

Figure 10:
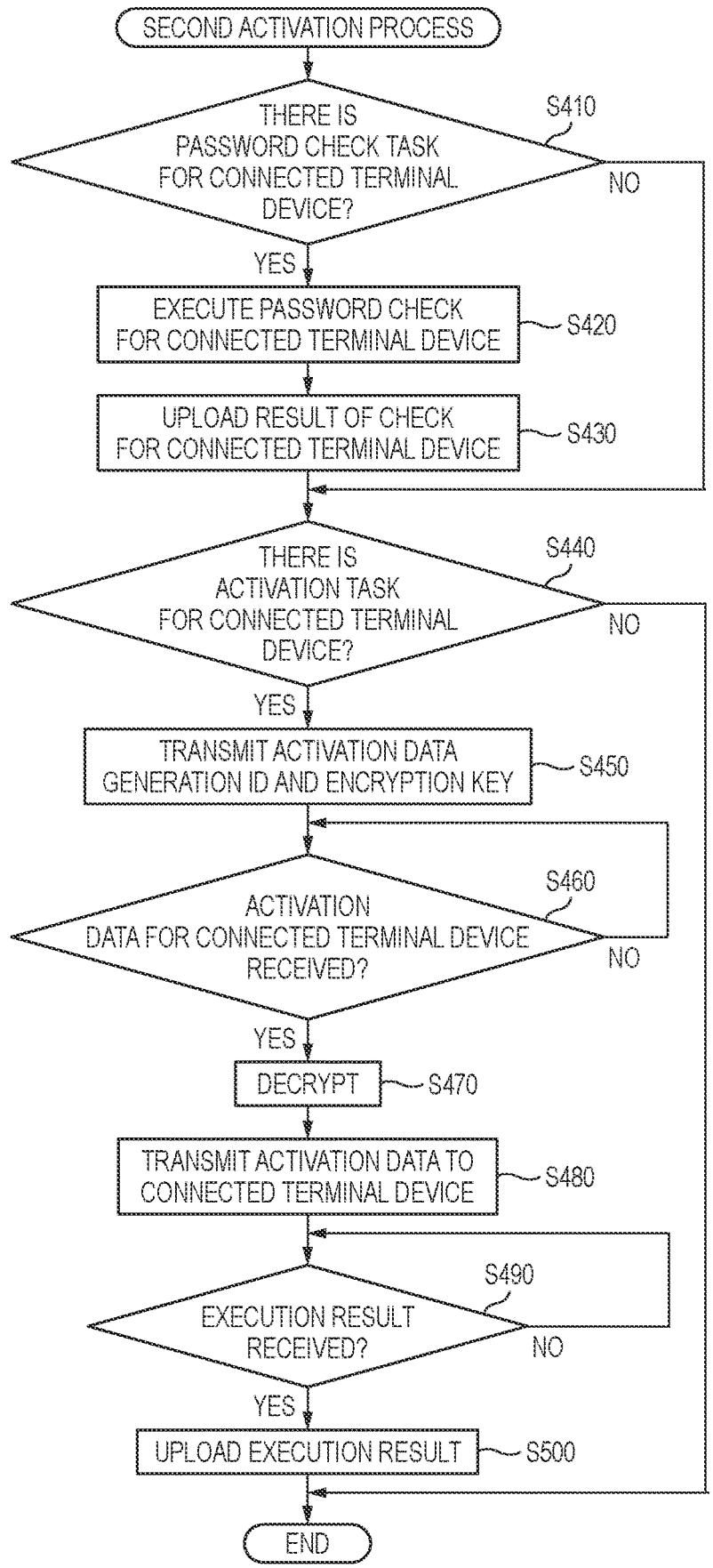
FIG. 10 is a flowchart showing a second activation process.

In a case where the second activation process is executed, as shown in FIG. 10, the CPU 41 of the controller 31 first determines in S410 whether the instant task entity of the password check task for the connected terminal device is downloaded from the cloud server 6. Here, if the instant task entity of the password check task is not downloaded, the CPU 41 proceeds to S440.

On the other hand, if the instant task entity of the password check task is downloaded, the CPU 41 executes the password check for the connected terminal device in S420. Then, the CPU 41 uploads the result of the password check for the connected terminal device to the cloud server 6 in S430, and then proceeds to S440.

Upon proceeding to S440, the CPU 41 determines whether the instant task entity of the activation task for the connected terminal device is downloaded from the cloud server 6. Here, if the instant task entity of the activation task for the connected terminal device is not downloaded, the CPU 41 ends the second activation process.

On the other hand, if the instant task entity of the activation task for the connected terminal device is downloaded, in S450, the CPU 41 extracts the activation data generation ID from the instant task entity of the activation task and transmits the extracted activation data generation ID and the encryption key having the expiration date to the license server 7.

Then, in S460, the CPU 41 determines whether the encrypted activation data for the connected terminal device is received from the license server 7. Here, if the encrypted activation data is not received, the CPU 41 repeats a process of S460 to stand by until the encrypted activation data is received.

In a case where the encrypted activation data is received, the CPU 41 decrypts the activation data with the encryption key in S470. Further, in S480, the CPU 41 transmits the decrypted activation data to the first type terminal device 4 that is the function extension target.

Then, in S490, the CPU 41 determines whether an execution result of activation of the function extension is received from the first type terminal device 4 that is the function extension target. Here, if the execution result of the activation is not received, the CPU 41 repeats a process of S490 to stand by until the execution result of the activation is received.

If the execution result of the activation is received, the CPU 41 uploads the execution result of the activation task to the cloud server 6 in S500, and then ends the second activation process.

(5) Effects

The management system 1 configured as described above includes the master 2, the client 3 and the second type terminal device 5 that is incapable of directly communicate with the master 2, the cloud server 6, and the license server 7. The cloud server 6 may communicate with the master 2, the client 3, and the second type terminal device 5. The license server 7 may communicate with the master 2, the client 3, and the second type terminal device 5. The second type terminal device 5 is a terminal device that is not communicably connected to the master 2. The client 3 is connected to at least one first type terminal device 4 that is not communicably connected to the master 2, the cloud server 6, and the license server 7.

In a case where the master 2 acquires from the license server 7 the activation data generation ID for identifying the activation data, the master 2 uploads the activation data generation ID to the cloud server 6. The activation data is data used for a function extension process that is executed by each of the client 3 and the second type terminal device 5 for the function extension for a respective one of the first type terminal device 4 and the second type terminal device 5.

The client 3 and the second type terminal device 5 each execute a transmission process, a decryption process, and a data usage process.

The transmission process is to, in a case where the activation data generation ID is downloaded from the cloud server 6, transmit the activation data generation ID and the encryption key having the expiration date to the license server 7.

The decryption process is to, in a case where the activation data encrypted with the encryption key is received from the license server 7, decrypt the received activation data with the encryption key having the expiration date.

The data usage process is to execute the function extension process by using the activation data decrypted in the decryption process.

By such a management system 1, the encryption key having the expiration date and the activation data encrypted with the encryption key having the expiration date may be directly transmitted and received between the license server 7 and each of the client 3 and the second type terminal device 5 rather than via the cloud server 6. Therefore, the management system 1 may prevent the expiration date of the encryption key having the expiration date from expiring. As a result, the management system 1 may prevent occurrence of a situation in which the activation data cannot be decrypted since the expiration date of the encryption key expires.

Although the embodiment of the present disclosure has been described above, the present disclosure is not limited to the embodiment described above and may be implemented in various modifications. A plurality of functions of one component in the embodiment described above may be implemented by a plurality of components, or one function of one component may be implemented by a plurality of components. A plurality of functions of a plurality of components may be implemented by one component, or one function to be implemented by a plurality of components may be implemented by one component. A part of a configuration of the embodiment described above may be omitted. At least a part of the configuration of the embodiment described above may be added to or replaced with a configuration of another embodiment.

In addition to the client 3 and the second type terminal device 5 described above, the present disclosure may also be implemented in various forms such as a system including the client 3 and the second type terminal device 5 as components, a program for causing a computer to function as the client 3 and the second type terminal device 5, a non-transitory tangible recording medium such as a semiconductor memory in which the program is recorded, and a management method.

What is claimed is:

1. A management system comprising:
   a management device;
   a device being incapable of directly communicating with the management device;
   a storage device configured to communicate with the management device and the device; and
   a server configured to communicate with the management device and the device,
   wherein the management device is configured to, in a case where the management device receives data identification information for identifying execution data from the server, upload the data identification information to the storage device, the execution data being used in a device execution process executed by the device, and
   wherein the device is configured to execute:
      a transmission process of, in a case where the device receives the data identification information from the storage device, transmitting the data identification information and an encryption key having an expiration date to the server;
      a decryption process of, in a case where the device receives the execution data encrypted with the encryption key from the server, decrypting the received execution data with the encryption key; and
      a data usage process of executing the device execution process by using the execution data decrypted in the decryption process.

2. The management system according to claim 1,
   wherein the device is a second terminal device that is not communicably connected to the management device.

3. The management system according to claim 1,
   wherein the device is a sub-management device to which a first terminal device is connected, the first terminal device being not communicably connected to the management device, the storage device, and the server.

4. The management system according to claim 3,
   wherein, in the device execution process, the sub-management device transmits the decrypted execution data to the first terminal device.

5. A device of a management system in which a management device and the device are each configured to communicate with a storage device and a server, the device being incapable of directly communicating with the management device,
   wherein a controller of the device is configured to execute:
      a transmission process of, in a case where the device receives data identification information from the storage device, transmitting the data identification information and an encryption key having an expiration date to the server, the data identification information being acquired from the server by the management device and being uploaded to the storage device by the management device, and the data identification information being information for identifying execution data that is used in a device execution process executed by the device;
      a decryption process of, in a case where the device receives the execution data encrypted with the encryption key from the server, decrypting the received execution data with the encryption key; and
      a data usage process of executing the device execution process by using the execution data decrypted in the decryption process.

6. A non-transitory computer readable medium storing a program causing a controller to execute processes, the controller being included in a device of a management system in which a management device and the device are each configured to communicate with a storage device and a server, the device being incapable of directly communicating with the management device, and the processes comprising:
   in a case where the device receives data identification information from the storage device, transmitting the data identification information and an encryption key having an expiration date to the server, the data identification information being acquired from the server by the management device and being uploaded to the storage device by the management device, and the data identification information being information for identifying execution data that is used in a device execution process executed by the device;
   in a case where the device receives the execution data encrypted with the encryption key from the server, decrypting the received execution data with the encryption key; and
   executing the device execution process by using the decrypted execution data.

7. A management method that is executed by a device of a management system in which a management device and the device are each configured to communicate with a storage device and a server, the device being incapable of directly communicating with the management device, the management method comprising:
   in a case where the device receives data identification information from the storage device, transmitting the data identification information and an encryption key having an expiration date to the server, the data identification information being information that is acquired from the server by the management device and being uploaded to the storage device by the management device, and the data identification information being information for identifying execution data that is used in a device execution process executed by the device;
   in a case where the execution data encrypted with the encryption key is received from the server, decrypting the received execution data with the encryption key; and
   executing the device execution process by using the decrypted execution data.

* * * * *